US006990572B2

(12) United States Patent
Ando

(10) Patent No.: US 6,990,572 B2
(45) Date of Patent: Jan. 24, 2006

(54) METHOD FOR PREVENTING A COMPUTER SYSTEM FROM BEING STARTED UP IN AN UNSTABLE CONDITION

(75) Inventor: Motoaki Ando, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 854 days.

(21) Appl. No.: 09/954,029

(22) Filed: Sep. 18, 2001

(65) Prior Publication Data
US 2002/0038434 A1 Mar. 28, 2002

(30) Foreign Application Priority Data
Sep. 25, 2000 (JP) ............................ 2000-291300

(51) Int. Cl.
G06F 15/177 (2006.01)
G06F 1/12 (2006.01)
(52) U.S. Cl. ........................... 713/1; 713/400; 713/600
(58) Field of Classification Search ................... 713/1, 713/600, 500, 400; 345/698, 699; 714/42
See application file for complete search history.

(56) References Cited

U.S. PATENT DOCUMENTS 5,483,471 A * 1/1996 Adachi ........................ 708/3
5,585,750 A 12/1996 Noguchi et al.
5,767,834 A * 6/1998 Vouri et al. ................. 345/698
6,535,986 B1 * 3/2003 Rosno et al. ................ 713/400

FOREIGN PATENT DOCUMENTS
EP 0 712 064 B1 8/2000
JP 11085127 A * 3/1999

* cited by examiner

Primary Examiner—Thomas Lee
Assistant Examiner—Suresh K Suryawanshi
(74) Attorney, Agent, or Firm—Finnegan, Henderson, Farabow, Garrett, Dunner, L.L.P.

(57) ABSTRACT

In a computer system, it is determined whether current operational frequencies of a memory and a CPU, which have been detected, coincide with operable frequencies of a memory system. When it has been determined that the current operational frequencies of the memory and the CPU coincide with the operable frequencies of the memory system, it is determined whether the current operational frequencies of the memory and the CPU coincide with individual operable frequencies of the memory and the CPU. When non-coincidence has been determined, the current operational frequencies of the memory and the CPU, which have been determined to be non-coincident, are set at the operable frequencies of the memory system corresponding to the current operational frequencies of the memory and the CPU which have been determined to be non-coincident.

10 Claims, 11 Drawing Sheets

|  |  | NOW | |
|---|---|---|---|
| CPU Inf. | Memory SPD Inf. | GPIOxx1 PSB set | GPIOxx2 MCLK set |
| 100MHz | any | 133MHz | any |
| 100MHz | 99MHz or less | 100MHz | any |
| 100MHz | 100MHz~132MHz、133MHz or more | 100MHz | 100MHz |
| 100MHz | 100MHz~132MHz、133MHz or more | 100MHz | 133MHz |
| 133MHz | 99MHz or less | 100MHz | any |
| 133MHz | 100MHz~132MHz | 100MHz | 100MHz |
| 133MHz | 100MHz~132MHz | 100MHz | 133MHz |
| 133MHz | 133MHz or more | 100MHz | 100MHz |
| 133MHz | 133MHz or more | 100MHz | 133MHz |
| 133MHz | 99MHz or less | 133MHz | any |
| 133MHz | 100MHz~132MHz | 133MHz | 100MHz |
| 133MHz | 100MHz~132MHz | 133MHz | 133MHz |
| 133MHz | 133MHz or more | 133MHz | 100MHz |
| 133MHz | 133MHz or more | 133MHz | 133MHz |

FIG. 7A

| NEXT | | |
|---|---|---|
| GPIOxx1 PSB set | GPIOxx2 MCLK set | Action |
| 100MHz | No change | Power off→ON by EC command |
| No change | No change | Stop with following display "Please remove the incompatible memory module in Slot X (0 or 1 as appropriate)" |
| No change | No change | Start up immediately |
| No change | 100MHz | Power off→ON by EC command |
| 133MHz | No change | Stop with following display "Please remove the incompatible memory module in Slot X (0 or 1 as appropriate)" |
| 133MHz | No change | Power off→ON by EC command |
| 133MHz | 100MHz | Power off→ON by EC command |
| 133MHz | 133MHz | Power off→ON by EC command |
| 133MHz | No change | Power off→ON by EC command |
| No change | No change | Stop with following display "Please remove the incompatible memory module in Slot X (0 or 1 as appropriate)" |
| No change | No change | Start up immediately |
| No change | 100MHz | Power off→ON by EC command |
| No change | 133MHz | Power off→ON by EC command |
| No change | No change | Start up immediately |

FIG. 7B

| CPU Inf. | Memory SPD Inf. (1) | Memory SPD Inf. (2) | NOW GPIOxx1 PSB set | GPIOxx2 MCLK set |
|---|---|---|---|---|
| 100MHz | any | any | 133MHz | any |
| 100MHz | 99MHz or less | 133MHz or more | 100MHz | any |
| 100MHz | 100MHz~132MHz, 133MHz or more | 133MHz or more | 100MHz | 100MHz |
| 100MHz | 100MHz~132MHz, 133MHz or more | 133MHz or more | 100MHz | 133MHz |
| 133MHz | 99MHz or less | 100MHz~132MHz | 100MHz | any |
| 133MHz | 100MHz~132MHz | 133MHz or more | 100MHz | 100MHz |
| 133MHz | 100MHz~132MHz | any | 100MHz | 133MHz |
| 133MHz | 133MHz or more | 133MHz or more | 100MHz | 100MHz |
| 133MHz | 133MHz or more | any | 100MHz | 133MHz |
| 133MHz | 99MHz or less | 100MHz~132MHz | 133MHz | any |
| 133MHz | 100MHz~132MHz | 100MHz~132MHz | 133MHz | 100MHz |
| 133MHz | 100MHz~132MHz | 133MHz or more | 133MHz | 133MHz |
| 133MHz | 133MHz or more | 133MHz or more | 133MHz | 100MHz |
| 133MHz | 133MHz or more | 133MHz or more | 133MHz | 133MHz |

F I G. 13A

| NEXT | | |
|---|---|---|
| GPIOxx1 PSB set | GPIOxx2 MCLK set | Action |
| 100MHz | No change | Power off→ON by EC command |
| No change | No change | Stop with following display "Please remove the incompatible memory module in Slot X (0 or 1 as appropriate)" |
| No change | No change | Start up immediately |
| No change | 100MHz | Power off→ON by EC command |
| 133MHz | No change | Stop with following display "Please remove the incompatible memory module in Slot X (0 or 1 as appropriate)" |
| 133MHz | No change | Power off→ON by EC command |
| 133MHz | 100MHz | Power off→ON by EC command |
| 133MHz | 133MHz | Power off→ON by EC command |
| 133MHz | No change | Power off→ON by EC command |
| No change | No change | Stop with following display "Please remove the incompatible memory module in Slot X (0 or 1 as appropriate)" |
| No change | No change | Start up immediately |
| No change | 100MHz | Power off→ON by EC command |
| No change | 133MHz | Power off→ON by EC command |
| No change | No change | Start up immediately |

FIG. 13B

METHOD FOR PREVENTING A COMPUTER SYSTEM FROM BEING STARTED UP IN AN UNSTABLE CONDITION

CROSS-REFERENCE TO RELATED APPLICATIONS

This application is based upon and claims the benefit of priority from the prior Japanese Patent Application No. 2000-291300, filed Sep. 25, 2000, the entire contents of which are incorporated herein by reference.

BACKGROUND OF THE INVENTION

1. Field of the Invention

The present invention relates to a computer system using different kinds of memories and CPUs, and more particularly to a notebook-type personal computer using different kinds of memories and CPUs.

2. Description of the Related Art

An $E^2PROM$ is currently mounted as a standard memory module in a notebook-type personal computer (hereinafter referred to as "note PC"). The data representing the capacity, operational frequency, timing, etc. of the memory module is called SPD.

An Intel's chip set has a register for adjusting a buffer performance and timing relating to memories from the generation of 430TX. In a conventional PC, the setting values of the register are adjusted in accordance with the SPD values of the memory module. Thus, the memory module is used with an optimal buffer performance and timing.

On the other hand, CPUs are operated with specific basic frequencies for individual systems. There is known an Intel's technique called "SpeedStep" as a dynamic switching technique for the frequency of the CPU. With this technique, the internal operational frequency of the CPU is dynamically changed, but the specific basic frequency of the individual system is not changed.

In the conventional note PC, the operational frequency of the supported memory and the operational frequency of the CPU are definitively determined. When a non-supported memory or CPU is used, the operational speed is lowered. In this case, the system becomes unstable and the computer system may not be operated.

Moreover, since the operational frequencies of the memory and CPU are fixed, even if a memory operable with a higher frequency is substituted, the performance of this memory cannot be fully exhibited.

BRIEF SUMMARY OF THE INVENTION

The present invention has been made in consideration of the above circumstances, and its object is to provide a computer system capable of performing a stable operation and fully exhibiting the performance of a memory and a CPU, by discriminating the current operational frequencies of the memory and CPU and switching the operational frequencies of the memory and CPU on the basis of the discrimination result.

According to a first aspect of the present invention, in order to achieve the object, there is provided a computer system comprising: a memory; a CPU for controlling the system; first detection means for detecting individual operable frequencies of the memory and the CPU; second detection means for detecting current operational frequencies of the memory and the CPU; first determination means for determining whether the current operational frequencies of the memory and the CPU, which have been detected by the second detection means, coincide with operable frequencies of a memory system; second determination means for determining, when the first determination means has determined that the current operational frequencies of the memory and the CPU, which have been detected by the second detection means, coincide with the operable frequencies of the memory system, whether the current operational frequencies of the memory and the CPU coincide with the individual operable frequencies of the memory and the CPU, which have been detected by the first detection means; and setting means for setting, when the second determination means has determined that the current operational frequencies of the memory and the CPU do not coincide with the individual operable frequencies of the memory and the CPU which have been detected by the first detection means, the current operational frequencies of the memory and the CPU, which have been determined to be non-coincident, at the operable frequencies of the memory system corresponding to the current operational frequencies of the memory and the CPU which have been determined to be non-coincident.

According to this invention, at first, the first determination means determines whether the current operational frequencies of the memory and the CPU, which have been detected by the second detection means, coincide with operable frequencies of the memory system. If coincidence is determined, the second determination means determines whether the current operational frequencies of the memory and the CPU coincide with the individual operable frequencies of the memory and the CPU, which have been detected by the first detection means.

When the second determination means has determined non-coincidence, the current operational frequencies of the memory and the CPU, which have been determined to be non-coincident, are set at the operable frequencies of the memory system corresponding to the current operational frequencies of the memory and the CPU which have been determined to be non-coincident. Thereby, it is possible to effect setting that matches with the operational frequencies of the CPU and the memory. As a result, the performance of the computer system can be fully exhibited, and the operation of the computer system can be stabilized.

According to a second aspect of the invention, the computer system of the first aspect further comprises means for displaying a message to the effect that the memory and the CPU which are non-coincident should be replaced, when the first determination means has determined that the current operational frequencies of the memory and the CPU, which have been detected by the second detection means, do not coincide with the operable frequencies of the memory system.

According to this invention, when the current operational frequencies of the memory and CPU do not correspond to the operable frequencies of the memory system, the computer system is prevented from being started up in an unstable condition.

According to a third aspect of the invention, the computer system of the first aspect further comprises third determination means for determining whether the setting means has set the current operational frequencies of the memory and the CPU, which have been determined to be non-coincident, at the operable frequencies of the memory system corresponding to the current operational frequencies of the memory and the CPU which have been determined to be non-coincident; and re-start-up means for re-starting up the computer system when the third determination means has determined that the setting means has completed the setting.

In this invention, the computer system is restarted up to make effective the operational frequencies of the newly set memory and CPU.

According to a fourth aspect of the invention, there is provided a computer system comprising: a first memory; a second memory; a CPU for controlling the system; first detection means for detecting a common individual operable frequency of the first memory and the second memory and an individual operable frequency of the CPU; second detection means for detecting current operational frequencies of the first memory, the second memory and the CPU; first determination means for determining whether the lower of the current operational frequencies of the first memory and the second memory and the current operational frequency of the CPU, which have been detected by the second detection means, coincide with operable frequencies of a memory system; second determination means for determining, when the first determination means has determined coincidence, whether the lower of the current operational frequencies of the first memory and the second memory and the current operational frequency of the CPU coincide with the common individual operable frequency of the first memory and the second memory and the individual operable frequency of the CPU, which have been detected by the first detection means; and setting means for setting, when the second determination means has determined non-coincidence, the current operational frequencies of the first memory, the second memory and the CPU, which have been determined to be non-coincident, at the operable frequencies of the memory system corresponding to the current operational frequencies of the first memory, the second memory and the CPU which have been determined to be non-coincident.

According to this invention, even where plural memories are mounted in the computer system, the lower of the current operational frequencies of the plural memories and the current operational frequency of the CPU are determined, and on the basis of the determination result the setting matching with the operational frequencies of the plural memories and CPU can be effected. As a result, the performance of the computer system can be fully exhibited, and the operation of the computer system can be stabilized.

BRIEF DESCRIPTION OF THE SEVERAL VIEWS OF THE DRAWING

FIG. 6 visually illustrates an operation of a CPU 1 for setting values in a register 4a;

FIGS. 7A and 7B illustrate the setting of values in the register 4a by the CPU 1 and subsequent operations;

FIGS. 13A and 13B illustrate a setting process for the computer system according to the embodiment.

DETAILED DESCRIPTION OF THE INVENTION

<First Embodiment>

Figure 1:
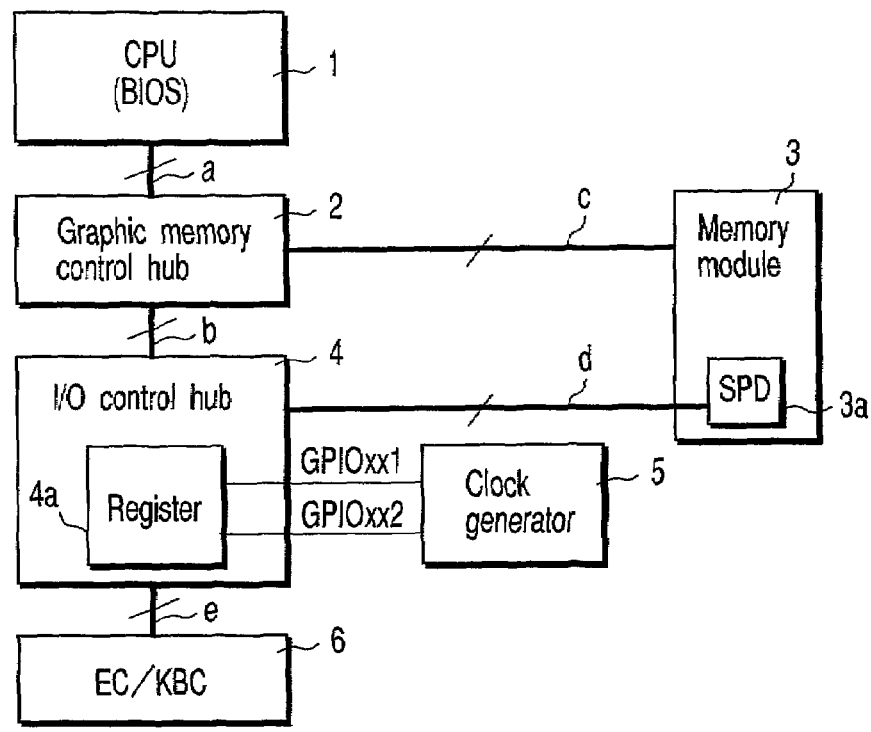
FIG. 1 is a block diagram showing a computer system according to a first embodiment of the present invention.

FIG. 1 is a block diagram showing a computer system according to a first embodiment of the present invention. FIG. 1 shows only necessary elements for describing the present invention, and such elements as a display and a storage are omitted.

In a control method in this embodiment, it is assumed that an Intel's 815E chip set is used, and 100 MHz and 133 MHz are supported for each of a CPU and a memory module.

As is shown in FIG. 1, a CPU 1 controlling the entirety of the system is connected to a graphic memory control hub 2 via a bus a. The graphic memory control hub 2 is connected to a memory module 3 via a memory bus c.

The memory module 3 is detachably mounted in a slot provided in the computer system. The memory module 3 stores SPD, which is data representing the capacity, operational frequency, timing, etc. of the memory module.

The graphic memory control hub 2 is connected to an I/O control hub 4 via a bus b. The I/O control hub 4 is connected to the memory module 3 via an SM bus d. The I/O control hub 4 has a register 4a.

A GPIOxx1 (general purpose I/O) of the register 4a represents an operational frequency of a current PSB (processor system bus), that is, an operational frequency of a current CPU. If the GPIOxx1 is "0", the operational frequency of the current CPU is 100 MHz. If the GPIOxx1 is "1", the operational frequency of the current CPU is 133 MHz. On the other hand, a GPIOxx2 of the register 4a represents an operational frequency of current memory module 3. If the GPIOxx2 is "0", the operational frequency of the current memory module 3 is 100 MHz. If the GPIOxx2 is "1", the operational frequency of the current memory module 3 is 133 MHz.

A clock generator 5 oscillates clock signals of operational frequencies of the CPU 1 and memory module 3 on the basis of the values of the GPIOxx1 and GPIOxx2 of the register 4a of I/O control hub 4. The values of the GPIOxx1 and GPIOxx2 are made effective when the system is started up.

An EC/KBC (embedded controller/keyboard controller) 6 is connected to the I/O control hub 4 via a bus e.

Figure 10:
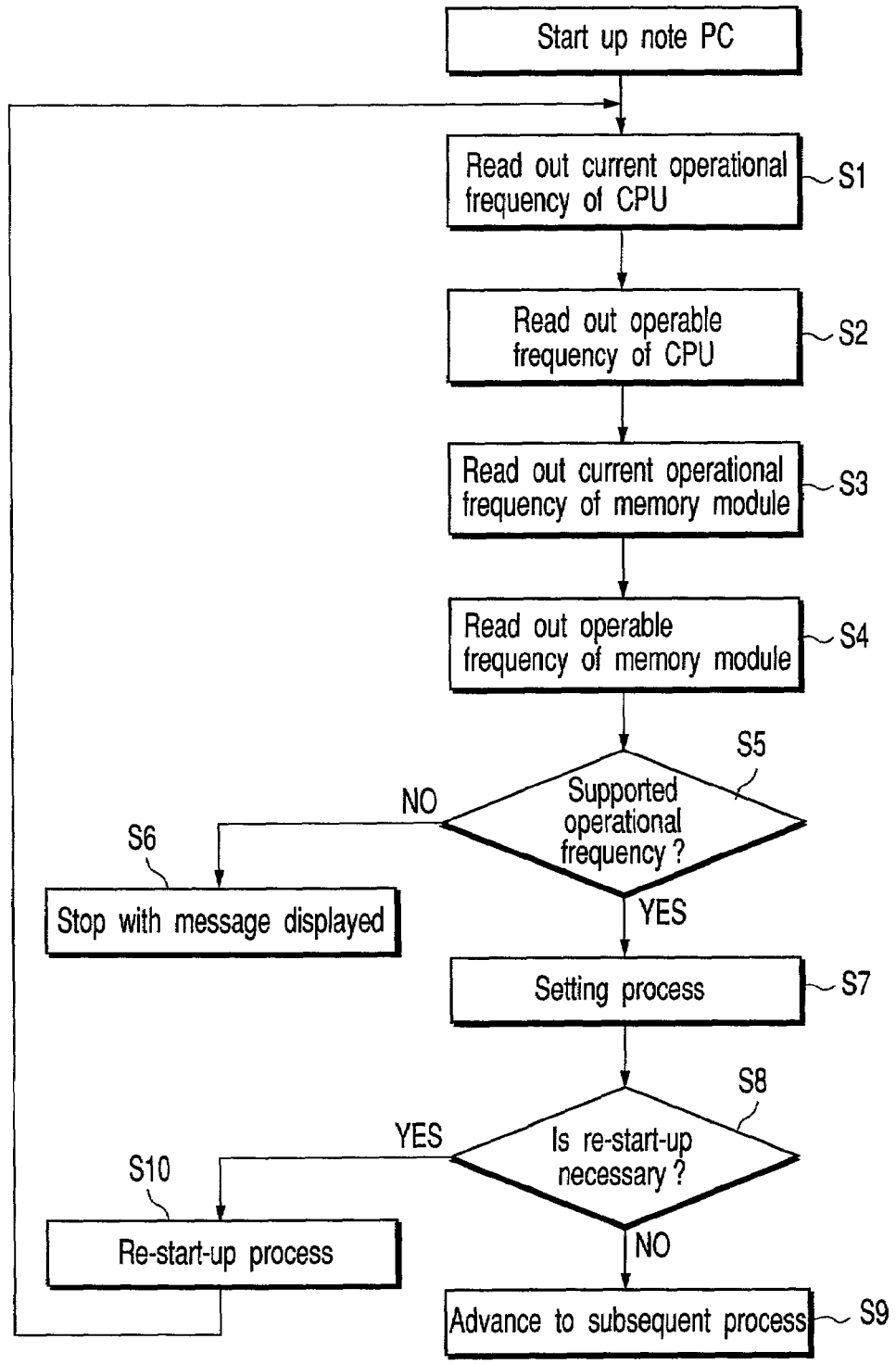
FIG. 10 is a flow chart illustrating the operation of the computer system according to the embodiment.

Referring to a flow chart of FIG. 10, a description will now be given of the operation for switching the operational frequencies of the CPU and memory module of the computer system according to the present embodiment. Assume that the operation for switching the operational frequencies is performed on the basis of a BIOS (basic input output system) process.

Figure 2:
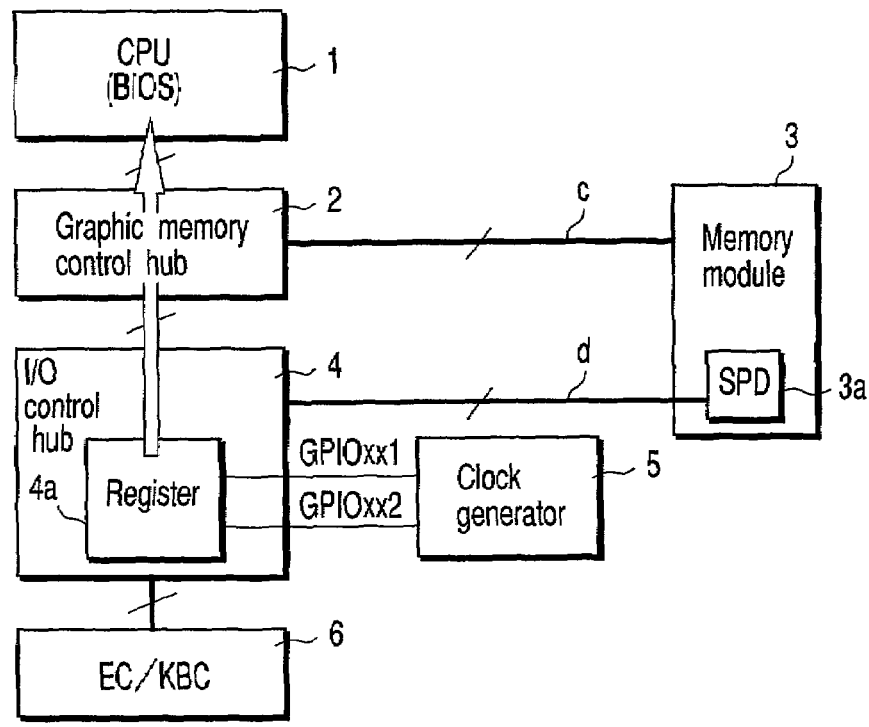
FIG. 2 visually illustrates an operation for reading out an operational frequency of a current CPU.

To begin with, if the note PC is started up, the CPU 1 reads out the setting of the GPIOxx1 of the I/O control hub 4, and reads out the operational frequency of the current PSB (processor system bus), i.e. the operational frequency of the current CPU (S1). FIG. 2 visually illustrates the operation of step S1.

If the value of GPIOxx1 (general purpose I/O) is "0", this means that the operational frequency of the current CPU is 100 MHz. If this value is "1", the operational frequency of the current CPU is 133 MHz.

Figure 3:
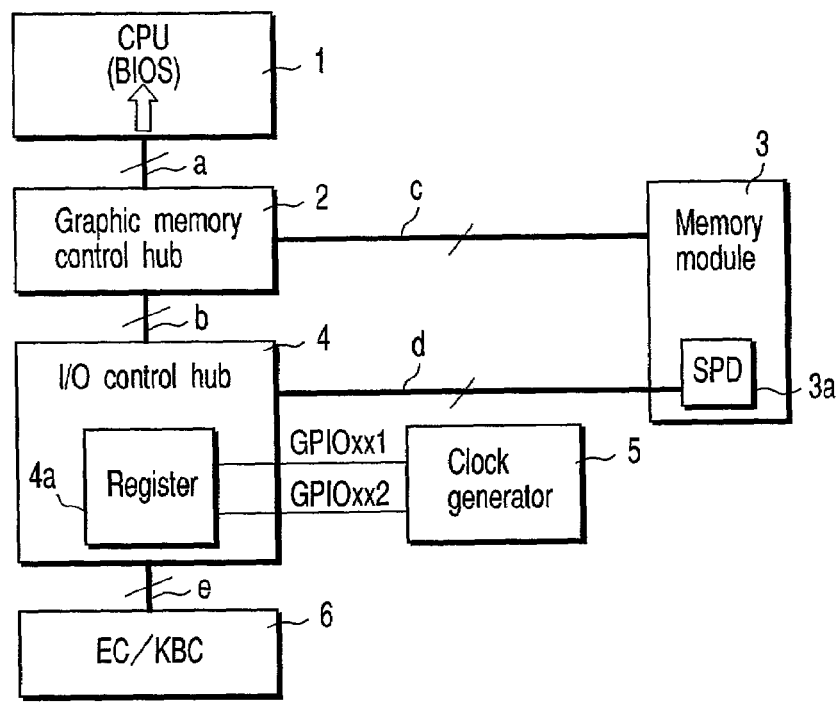
FIG. 3 visually illustrates an operation for reading out an operable frequency of a CPU from a register of the CPU.

Then, the operable frequency (individual operable frequency) of the CPU is read out of a register, e.g. a cache memory, of the CPU 1 (S2). Assume that 100 MHz or 133 MHz is stored in the register of CPU 1 as the operable frequency of the CPU. FIG. 3 visually illustrates the operation of step S2.

Figure 4:
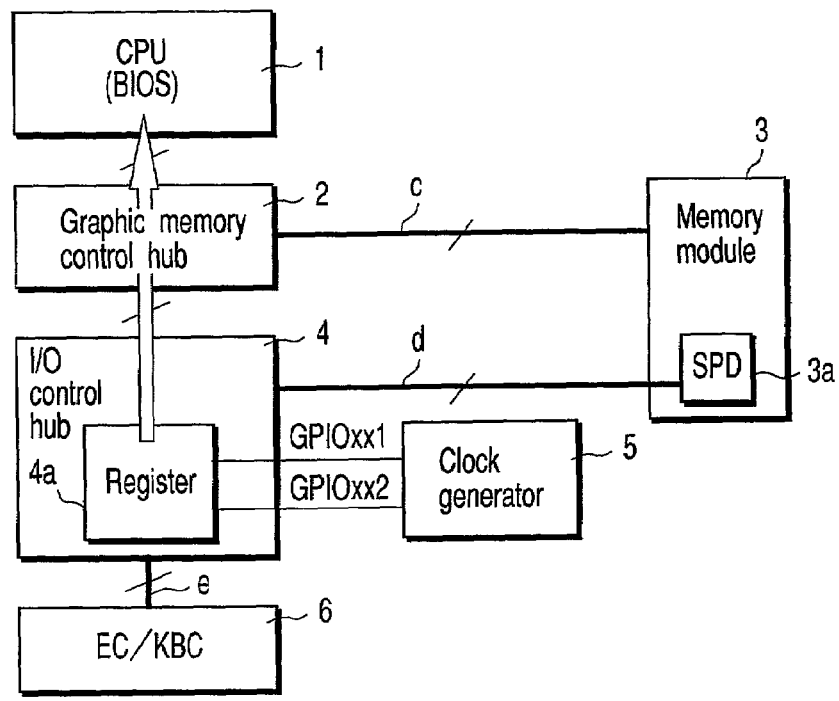
FIG. 4 visually illustrates an operation for reading out setting of GPIOxx2 of an I/O control hub 4.

The CPU 1 then reads out the setting of GPIOxx2 of the I/O control hub 4, and the operational frequency of the current memory module 3 (S3). FIG. 4 visually illustrates the operation of S3.

If the value of GPIOxx2 is "0", this means that the operational frequency of the memory module 3 is 100 MHz. If this value is "1", the operational frequency of the current memory module 3 is 133 MHz.

Figure 5:
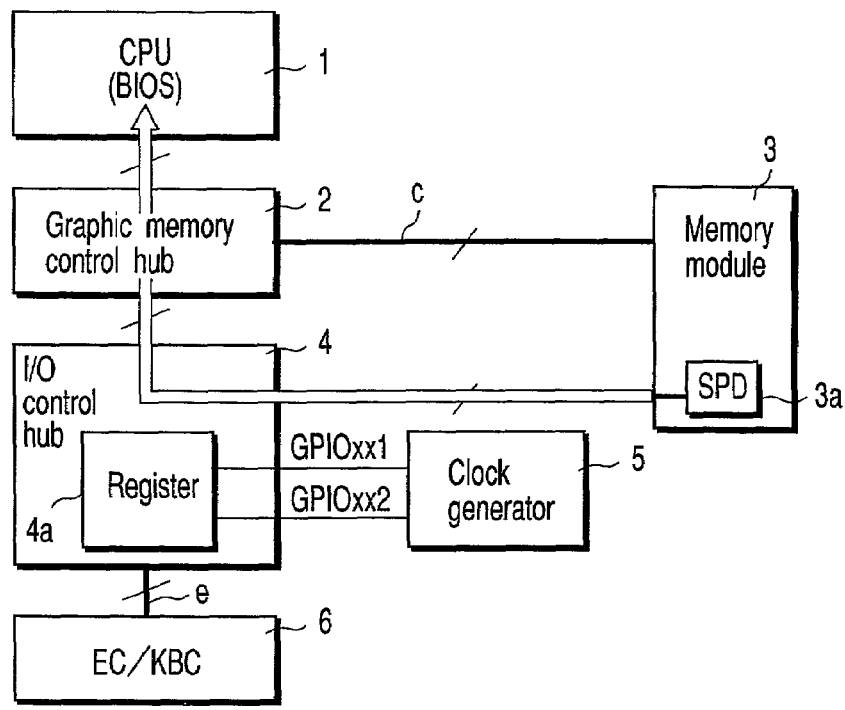
FIG. 5 visually illustrates an operation for reading out SPD3a via an SM bus d.

The CPU 1 reads out the SPD 3a from the memory module 3 via the SM bus d, and thus reads out the operable frequency (individual operable frequency) of the memory module 3 (S4). FIG. 5 visually illustrates the operation of S4.

For example, the operable frequency of the memory module 3 is found from the value of memory address 126.

Specifically, when the value of memory address 126 is "63H" or less, the operable frequency of the memory module 3 is 99 MHz or less. When the value of memory address 126 is "64H to 84H", the operable frequency of the memory module 3 is 100 MHz to 132 MHz. When the value of memory address 126 is "85H" or more, the operable frequency of the memory module 3 is 133 MHz or more.

Subsequently, the CPU 1 determines whether the read-out operational frequencies of the current CPU 1 and current memory module 3 are the supported operational frequencies (S5).

Specifically, it is presupposed in this embodiment that the operational frequencies of the CPU 1 and memory module 3 are 100 MHz and 133 MHz. Thus, if the current operational frequency of the memory module 3 is 99 MHz or less, it is determined that this operational frequency is not supported.

If it is determined in step S5 that the current operational frequency is not the supported frequency, a message is displayed on the display (not shown) and the operational frequency switching process is finished (S6). As regards the messages, see FIGS. 7A and 7B.

On the other hand, if it is determined in step S5 that the current operational frequency is the supported frequency, a setting process illustrated in FIGS. 7A and 7B is initiated (S7).

Some of examples in FIGS. 7A and 7B will now be described.

1. Where the individual operable frequency of the CPU is 100 MHz and the individual operable frequency of the memory module is any frequency, and where the value of the current GPIOxx1 is 133 MHz and the value of GPIOxx2 is any operational frequency, →the value of GPIOxx1 is set at 100 MHz and the value of GPIOxx2 is unchanged.

2. Where the individual operable frequency of the CPU is 100 MHz and the individual operable frequency of the memory module is 99 MHz or less, and where the value of the current GPIOxx1 is 100 MHz and the value of GPIOxx2 is any operational frequency, →the value of GPIOxx1 and the value of GPIOxx2 are unchanged.

3. Where the individual operable frequency of the CPU is 100 MHz and the individual operable frequency of the memory module is 100 MHz to 132 MHz, or 133 MHz or more, and where the value of the current GPIOxx1 is 100 MHz and the value of GPIOxx2 is 100 MHz, →the value of GPIOxx1 and the value of GPIOxx2 are unchanged.

In short, in the setting process of step S7, when the individual operable frequencies of the CPU and memory module are different from the current operational frequencies of GPIOxx1 and GPIOxx2, the values of GPIOxx1 and GPIOxx2 are changed to the individual operable frequencies of the CPU and memory module.

Figure 6:
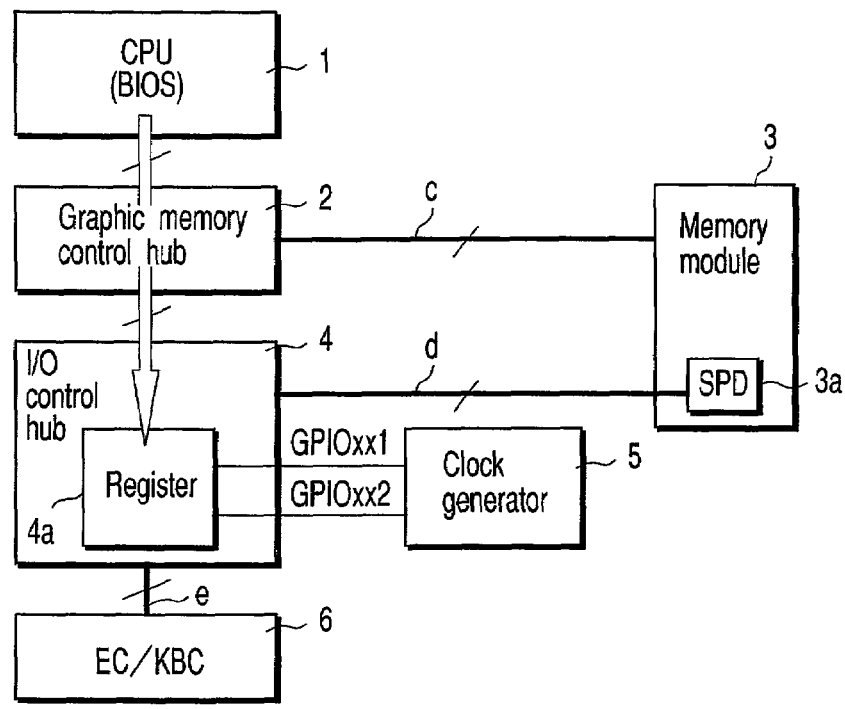

FIG. 6 visually illustrates the operation of the CPU 1 for setting values in the register 4a.

If the setting process in step S7 is finished, the CPU 1 determines whether re-start-up is necessary (S8). Specifically, if at least one of the values of GPIOxx1 and GPIOxx2 has been changed in the setting process of step S7, the re-start-up is required. The reason is that the values of GPIOxx1 and GPIOxx2 are first made effective by the re-start-up.

Figure 8:
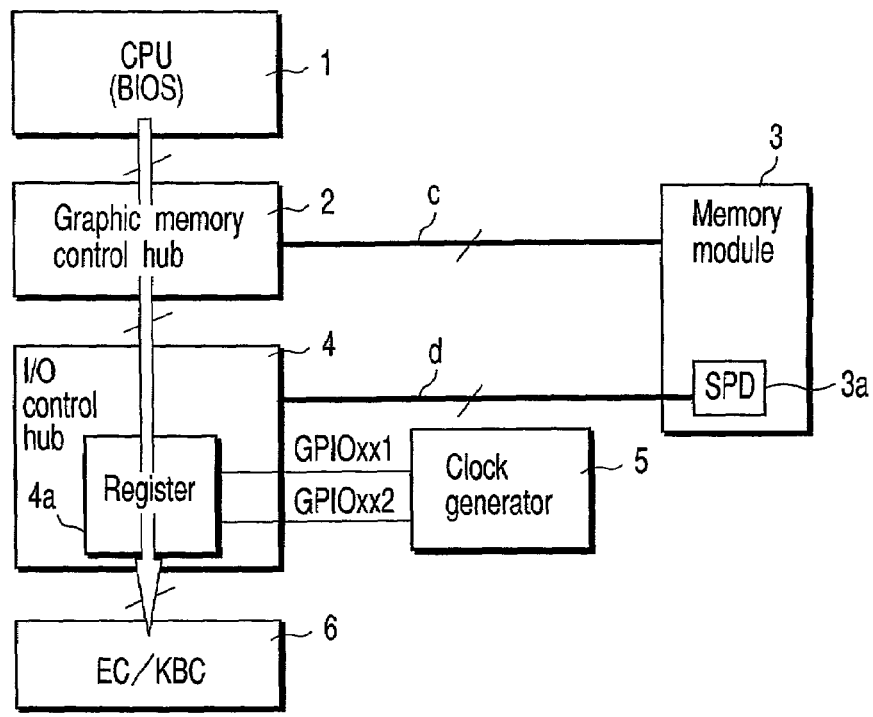
FIG. 8 visually illustrates a re-start-up process.

If it is determined in step S8 that the re-startup is necessary, a re-start-up process for the note PC is executed (S10) and the control returns to the process of step S1. On the other hand, if it is determined in step S8 that the re-start-up is not necessary, the control advances to a subsequent process (S9). FIG. 8 visually illustrates the re-start-up process.

Figure 9:
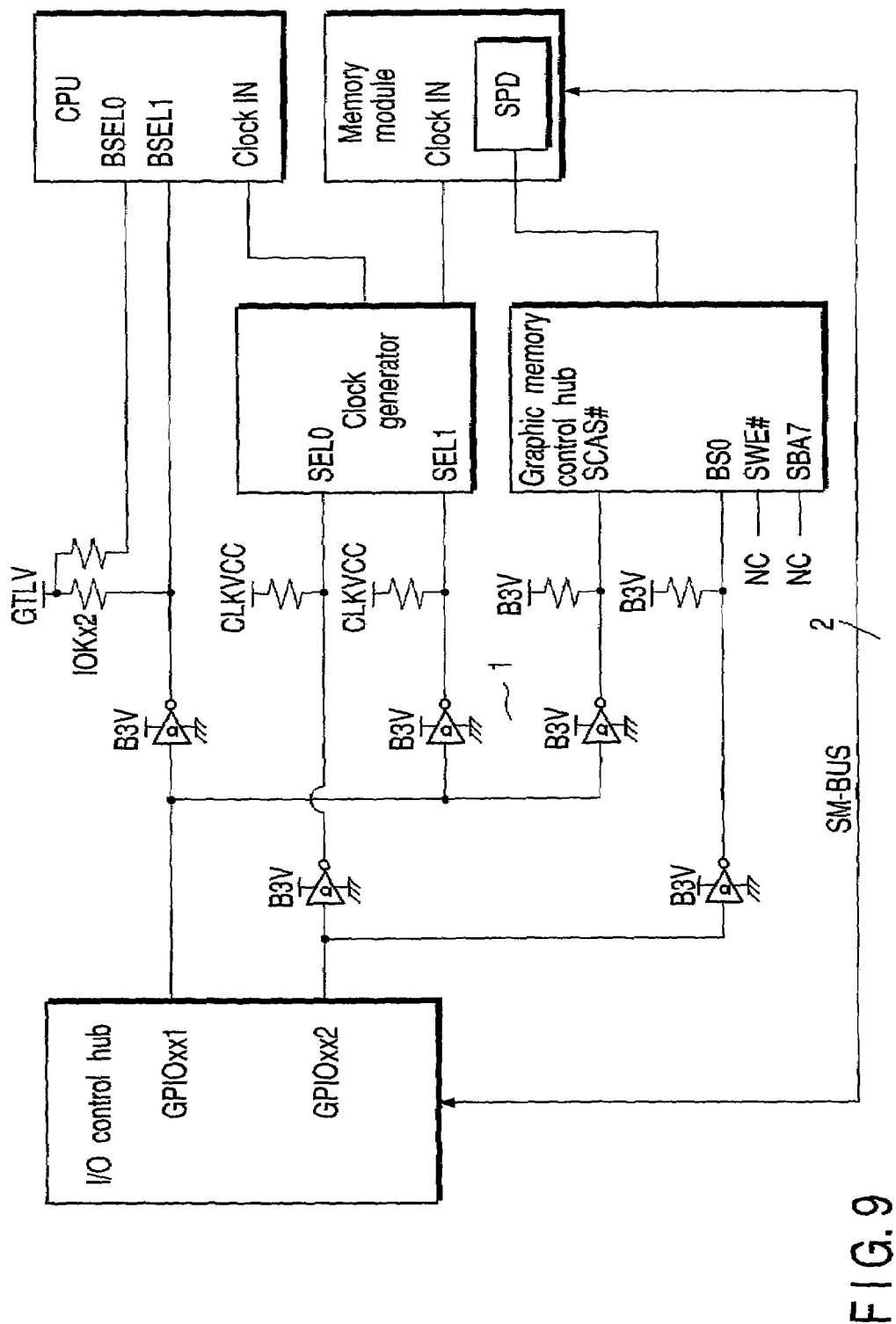
FIG. 9 is a circuit diagram of the computer system according to the embodiment.

FIG. 9 is a circuit diagram of the computer system according to the present embodiment.

In FIG. 9, if the output of GPIOxx1 is set at "0", the frequency of the PSB (processor system bus) of the CPU is changed to 100 MHz. If the output of GPIOxx1 is set at "1", the frequency of the PSB of the CPU is changed to 133 MHz. The output of GPIOxx1 is set in the register of the I/O control hub.

If the output of GPIOxx2 is set at "0", the clock frequency of the memory module is changed to 100 MHz. If the output of GPIOxx2 is set at "1", the clock frequency of the memory module is changed to 133 MHz. The output of GPIOxx2 is set in the register of the I/O control hub.

According to the computer system of the present embodiment, the operational frequency of the current CPU and the operational frequency of the current memory module are detected, and the values of GPIOxx1 and GPIOxx2 set in the register 4a of the I/O control hub 4 are read out.

It is first determined whether the detected operational frequencies of the current memory module and CPU coincide with the predetermined operational frequencies (100 MHz and 133 MHz for the CPU and memory module in this embodiment). If the operational frequencies do not coincide, a message is displayed to the effect that the memory module and CPU have to be replaced, and the operational frequency switching process is finished.

On the other hand, if the detected operational frequencies of the current memory module and CPU coincide with the predetermined operational frequencies, it is then determined whether the operational frequencies of the current CPU and memory module differ from the operational frequencies represented by the current values of GPIOxx1 and GPIOxx2. If the operational frequencies are different, the values of GPIOxx1 and GPIOxx2 are changed to confirm to the operational frequencies of the current CPU and memory module.

According to the computer system of the present embodiment, the current operational frequencies of the memory and CPU are discriminated and on the basis of the discrimination result the currently set operational frequencies are changed to optimal values. Therefore, the computer system capable of stably operating and fully exhibiting the performances of the memory and CPU can be provided.

<Second Embodiment>

A computer system according to a second embodiment of the present invention will now be described. In the first embodiment, the number of memory modules is one. In the second embodiment, a plurality of memory modules are provided.

In the second embodiment, like the first embodiment, it is assumed that an Intel's 815E chip set is used, and 100 MHz and 133 MHz are supported for each of the CPU and memory modules.

Figure 11:
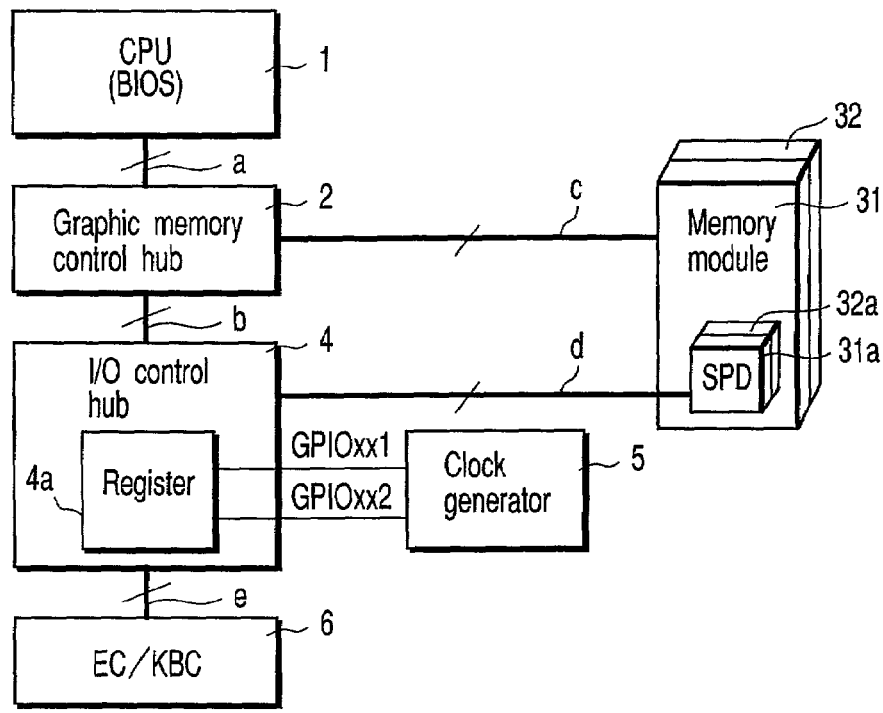
FIG. 11 is a block diagram showing a computer system according to a second embodiment of the invention.

FIG. 11 is a block diagram showing the computer system according to the second embodiment of the invention. The structural elements common to those in FIG. 1 are denoted by like reference numerals, and a description thereof is omitted.

As is shown in FIG. 11, the computer system of the second embodiment differs from the computer system shown in the block diagram of FIG. 1 in that a plurality of memory modules are provided.

Memory modules 31 and 32 are connected to the graphic memory control hub 2 via the memory bus c, and to the I/O control hub 4 via the SM bus d.

The memory modules 31, 32 have SPDs 31a, 31a, each being data representing the capacity, operational frequency, timing, etc. of the associated memory module.

Figure 12:
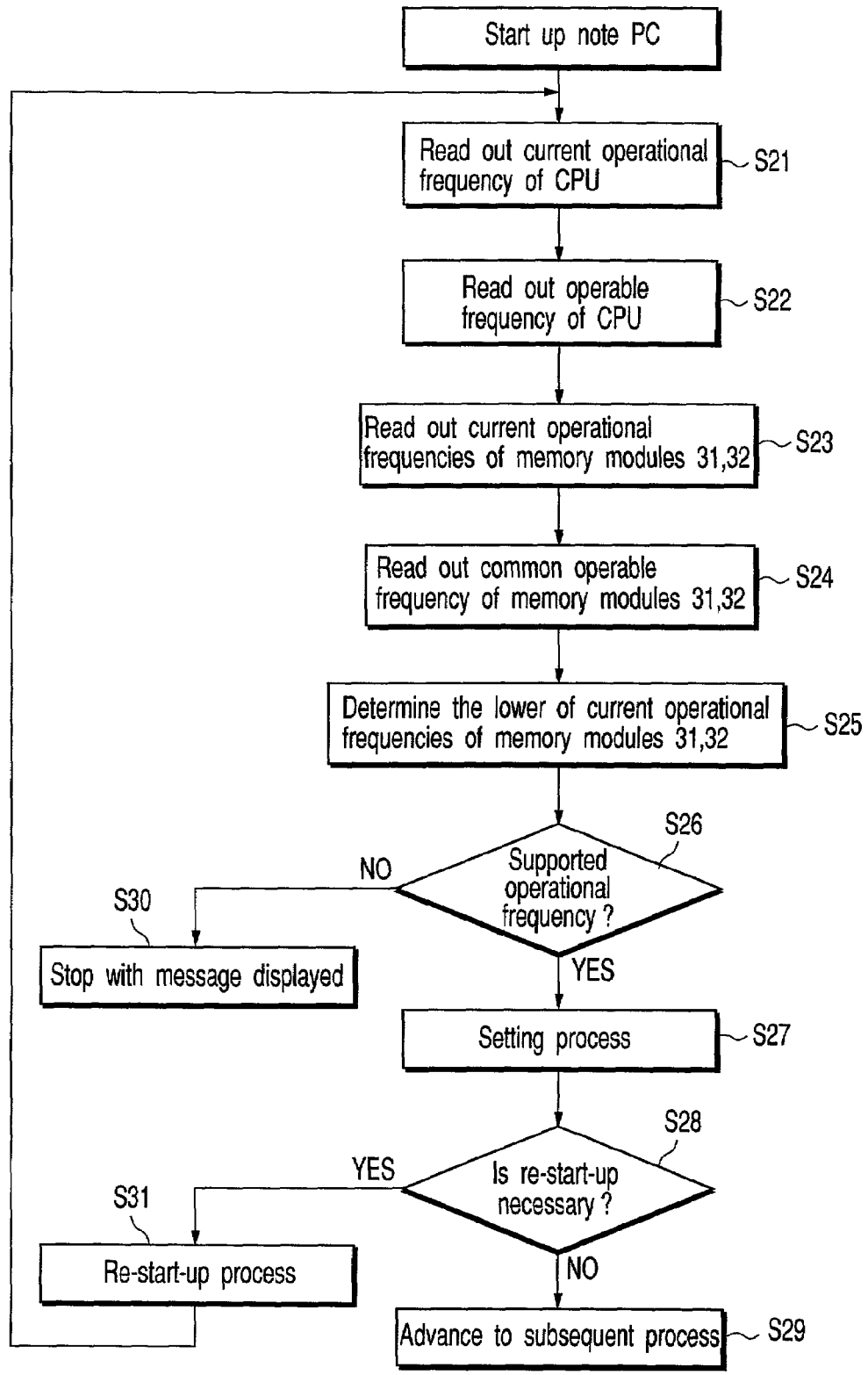
FIG. 12 is a flow chart illustrating the operation of the computer system according to the embodiment.

Referring to a flow chart of FIG. 12, a description will now be given of the operation for switching the operational frequencies of the CPU and plural memory module of the computer system according to the present embodiment. Assume that the operation for switching the operational frequencies is performed on the basis of a BIOS (basic input output system) process.

To begin with, if the note PC is started up, the CPU 1 reads out the setting of the GPIOxx1 of the I/O control hub 4, and reads out the operational frequency of the current PSB (processor system bus), i.e. the operational frequency of the current CPU (S21).

If the value of GPIOxx1 (general purpose I/O) is "0", this means that the operational frequency of the current CPU is 100 MHz. If this value is "1", the operational frequency of the current CPU is 133 MHz.

Then, the operable frequency of the CPU is read out of a register, e.g. a cache memory, of the CPU 1 (S22). Assume that 100 MHz or 133 MHz is stored in the register of CPU 1 as the operable frequency of the CPU.

The CPU 1 then reads out the setting of GPIOxx2 of the I/O control hub 4, and the operational frequencies of the current memory modules 31 and 32 (S23).

The CPU 1 reads out the SPD 31a and SPD 32a from the memory modules 31 and 32 via the SM bus d, and thus reads out the operable frequencies of the memory modules 31 and 32 (S24).

The CPU 1 then determines the lower of the current operational frequencies of the current memory modules 31 and 32 (S25). For example, if the current operational frequency of the memory module 31 is 100 MHz and the operational frequency of the memory module 32 is 133 MHz, the frequency of 100 MHz is determined as the operational frequency of the memory modules.

Subsequently, the CPU 1 determines whether the read-out operational frequency of the current CPU 1, the operational frequency of the memory module 31 and the operational frequency of the memory module 32 are the supported operational frequencies (S26).

Specifically, it is presupposed in this embodiment that the operational frequencies of the CPU 1 and memory modules 31 and 32 are 100 MHz and 133 MHz. Thus, even if the current operational frequency of the memory module 31 is 100 MHz, if the current operational frequency of the memory module 32 is 99 MHz or less, it is determined that the operational frequency is not supported.

If it is determined in step S26 that the current operational frequency is not the supported frequency, a message is displayed on the display (not shown) and the operational frequency switching process is finished (S30).

On the other hand, if it is determined in step S26 that the current operational frequency is the supported frequency, a setting process illustrated in FIGS. 13A and 13B is initiated (S27).

Some of examples in FIGS. 13A and 13B will now be described.

1. Where the individual operable frequency of the CPU is 100 MHz, the individual operable frequency of the memory module 31 is any frequency and the individual operable frequency of the memory module 32 is also any frequency, and where the value of the current GPIOxx1 is 133 MHz and the value of GPIOxx2 is any operational frequency, →the value of GPIOxx1 is set at 100 MHz and the value of GPIOxx2 is unchanged.

2. Where the individual operable frequency of the CPU is 100 MHz, the individual operable frequency of the memory module 31 is 99 MHz or less and the individual operable frequency of the memory module 32 is 133 MHz or more, and where the value of the current GPIOxx1 is 100 MHz and the value of GPIOxx2 is any operational frequency, →the value of GPIOxx1 and the value of GPIOxx2 are unchanged.

3. Where the individual operable frequency of the CPU is 100 MHz, the individual operable frequency of the memory module 31 is 100 MHz to 132 MHz, or 133 MHz or more, and the individual operable frequency of the memory module 32 is 133 MHz or more, and where the value of the current GPIOxx1 is 100 MHz and the value of GPIOxx2 is 100 MHz, →the value of GPIOxx1 and the value of GPIOxx2 are unchanged.

In short, in the setting process of step S27, when the operable frequency of the CPU and the lower of the operable frequencies of the memory modules 31 and 32, which is determined in step S25, are different from the current operational frequencies of GPIOxx1 and GPIOxx2, the values of GPIOxx1 and GPIOxx2 are changed to the operable frequencies of the CPU and memory modules.

If the setting process in step S27 is finished, the CPU 1 determines whether re-start-up is necessary (S28). Specifically, if at least one of the values of GPIOxx1 and GPIOxx2 has been changed in the setting process of step S27, the re-start-up is required. The reason is that the values of GPIOxx1 and GPIOxx2 are first made effective by the re-start-up.

If it is determined in step S28 that the re-start-up is necessary, a re-start-up process for the note PC is executed (S31) and the control returns to the process of step S21. On the other hand, if it is determined in step S28 that the re-start-up is not necessary, the control advances to a subsequent process (S29).

According to the computer system of this embodiment, even where plural memory modules are provided, the operational frequencies of the CPU and plural memory modules are discriminated and the operational frequencies are set once again on the basis of the discrimination result. Thus, the performance of the computer system can be fully exhibited, and the operation of the computer system can be stabilized.

The present invention is not limited to the above embodiments, and various modifications can be made without departing from the spirit of the invention at the stage of carrying out the invention. The respective embodiments may be combined if possible, and the advantages of the combined embodiments can be obtained. Each embodiment includes inventions of various stages, and various inventions may be derived from suitable combinations of disclosed structural elements. For example, if an invention is derived by omitting some of the structural elements disclosed in the embodiments, and this derived invention is carried out, the omitted structural elements are suitably compensated by well-known art.

As has been described above in detail, the present invention can provide a computer system capable of performing a stable operation and fully exhibiting the performance of a memory and a CPU, by discriminating the current operational frequencies of the memory and CPU and switching the operational frequencies of the memory and CPU on the basis of the discrimination result.

What is claimed is:

1. An electronic apparatus comprising:
   a memory;
   a CPU for controlling the system;
   first detection means for detecting respective operable frequencies of the memory and the CPU;
   second detection means for detecting current operational frequencies of the memory and the CPU, respectively;
   determination means for determining whether the current operational frequencies of the memory and the CPU, which are detected by the second detection means, coincide with the respective operable frequencies of the memory and the CPU; and
   changing means for changing, when the determination means determines that the current operational frequencies of the memory and the CPU do not coincide with the respective operable frequencies of the memory and the CPU, the current operational frequencies of the memory and the CPU so as to coincide with the respective operable frequencies of the memory and the CPU.

2. The electronic apparatus according to claim 1, further comprising:
   means for displaying a message to the effect that the memory and the CPU which are non-coincident should be replaced, when the determination means determines that the current operational frequencies of the memory and the CPU are not supported by the memory and the CPU.

3. The electronic apparatus according to claim 1, further comprising:
   re-start-up means for re-starting up the electronic apparatus after changing the current operational frequencies of the memory and the CPU.

4. An electronic apparatus comprising:
   a first memory;
   a second memory;
   a CPU for controlling the system;
   first detection means for detecting respective operable frequencies of the first memory and the second memory and an operable frequency of the CPU;
   second detection means for detecting respective current operational frequencies of the first memory, the second memory and the CPU;
   determination means for determining whether a lower operational frequency of the current operational frequencies of the first memory and the second memory and the current operational frequency of the CPU, which are detected by the second detection means, coincide with operable frequencies of the first memory, the second memory, and the CPU, respectively; and
   changing means for changing, when the determination means determines that the lower operational frequency and the current operational frequency of the CPU do not coincide with the respective operable frequencies of the first memory and the second memory and the individual operable frequency of the CPU, the lower operational frequency and the current operational frequency of the CPU so as to coincide with the respective operable frequencies.

5. The electronic apparatus according to claim 4, further comprising:
   means for displaying a message to the effect that the first memory, the second memory and the CPU which are non-coincident should be replaced, when the first determination means determines that the respective current operational frequencies of the first memory, the second memory and the CPU are not supported by the first memory, the second memory, and the CPU.

6. The electronic apparatus according to claim 4, further comprising:
   re-start-up means for re-starting up the electronic apparatus after changing any of the respective current operational frequencies.

7. An operational frequency switching method in an electronic apparatus, comprising:
   detecting respective operable frequencies of a memory and a CPU;
   detecting respective current operational frequencies of the memory and the CPU;
   determining whether the respective current operational frequencies of the memory and the CPU coincide with the detected respective operable frequencies of the memory and the CPU; and
   changing, when it is determined that the current operational frequencies of the memory and the CPU do not coincide with the respective individual operable frequencies of the memory and the CPU, the current operational frequencies of the memory and the CPU so as to coincide with the respective detected operable frequencies of the memory and the CPU.

8. The method according to claim 7, further comprising:
   re-starting up the electronic apparatus after changing the respective current operational frequencies of the memory and the CPU.

9. An operational frequency switching method in an electronic apparatus, comprising:
   detecting respective operable frequency of a first memory and a second memory and an operable frequency of a CPU;
   detecting respective current operational frequencies of the first memory, the second memory and the CPU;
   determining whether a lower operational frequency of the current operational frequencies of the first memory and the second memory and the current operational frequency of the CPU coincide with operable frequencies of a memory first memory, the second memory, and the CPU, respectively; and
   changing, when it is determined that the lower operational frequency and the current operational frequency of the CPU do not coincide with the respective operable frequencies of the first memory and the second memory and the individual operable frequency of the CPU, the lower operational frequency and the current operational frequency of the CPU so as to coincide with the respective detected operable frequencies.

10. The method according to claim 9, further comprising:
re-starting up the electronic apparatus after changing any of the respective current operational frequencies.

* * * * *